INVENTORS
ROGER C. GREENHALGH
DAVID E. NORTON
BY
Carl C. Kling
ATTORNEY

United States Patent Office 3,049,291
Patented Aug. 14, 1962

3,049,291
TAPE READER CONTROL

Roger C. Greenhalgh and David E. Norton, Poughkeepsie, N.Y., assignors to International Business Machines Corporation, New York, N.Y., a corporation of New York Filed Sept. 30, 1959, Ser. No. 843,482
2 Claims. (Cl. 235—61.11)

This invention relates to tape readers, and more particularly to electronic mechanism for synchronously controlling a tape reader and a computer.

Tape input and output devices have become widely accepted in the computer industry. Magnetic tapes, because of their close packing of information bits and their high speed and reliability, are most popular. Paper tapes, however, principally because of their low cost and compatibility with teletype and other systems, are also used. Paper tape reading is very slow when compared with computer speeds in the microsecond range, primarily because of transport problems, but computers operating with paper tape readers often are programmed for time sharing between computing operations and input operations. This time sharing makes possible bit-count parity checking and even more elaborate and extensive checking of each group of data (character or byte) read into the computer, while the tape reader is transporting tape to position a subsequent character at the read station.

In certain magnetic tape read-computer combinations, when a reading error is sensed, a tape halt-backspace-reread sequence is followed, so that the computer may again check the false character to determine whether the error occurred in the writing of the character on tape, or in the reading of the character from tape. Magnetic tape readers operating at economical speeds are not generally capable of stopping "on the character"; to reread the false character, a tape halt-backspace-reread sequence is followed.

Tape reader-computer combinations in the prior art generally operate under direct computer control. The computer selects a particular input tape reader by a "select" signal; the computer commands, by means of a "copy" signal via one of a plurality of operation control paths, that a character of data be read and transmitted. For a tape halt-backspace-reread sequence, there may be as many as four signals, i.e., "select," "halt," "backspace" and "copy."

Ordinary magnetic tape readers operate by a change of magnetic flux and are inherently dependent upon relative motion between tape and head. Paper tapes, however, are susceptible to reading by conductive or photoelectric means while stationary; the data holes and sprocket hole in a particular paper tape character can provide continuous signals during their sojourn at the read station, whether it be for a millisecond or a minute. Reading of the stationary tape becomes possible, as does continuous reading (rereading by gating) in flight.

Certain paper tape readers operating at rated speeds are capable of stopping on the character. Such readers are very slow when contrasted with computer speeds, but the convenience and economy of paper tape and the possibility of economical time-sharing by the computer often make it economically feasible to combine such a paper tape reader with a computer.

An object of the invention is to provide improved tape reader control mechanism for coupling a paper tape reader to a computer with a minimum necessity of operation control signal paths.

Another object of the invention is to provide an improved tape reader control mechanism for controlling a tape reread function without backspace.

A more particular object of the invention is to provide an improved tape reader control mechanism for controlling, selectively, multiple in-flight reread functions or an on-the-character stop with further reread functions.

The foregoing and other objects, features and advantages of the invention will be apparent from the following more particular description of preferred embodiments of the invention, as illustrated in the accompanying drawings.

Figure 1:
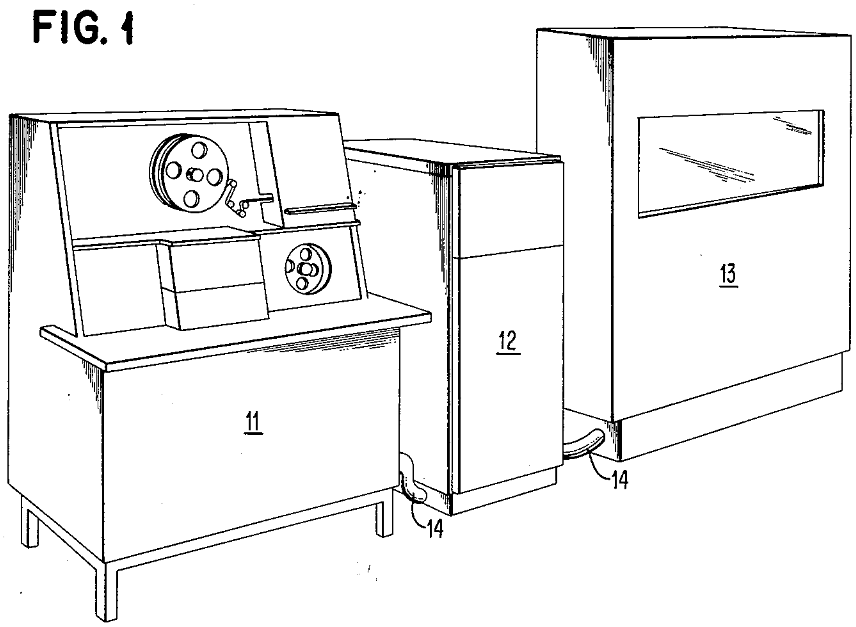
FIG. 1 illustrates a complete system including paper tape reader, computer, and connecting intermediary control unit according to the invention.
Figure 2:
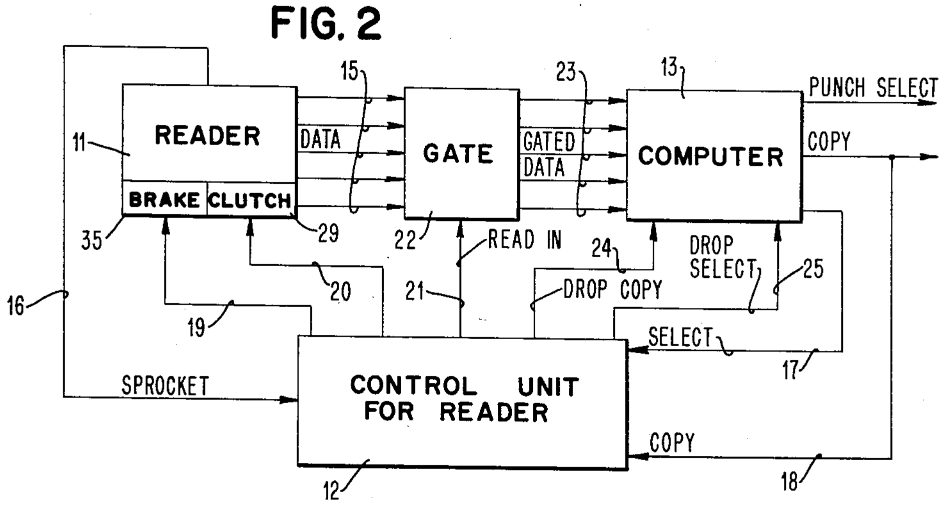
FIG. 2 illustrates in block diagram form the paper tape reader, computer and connecting control unit according to the invention.

*FIGS. 1 and 2—System and Block Diagrams*

Paper tape unit 11 is connected via control unit 12 to electronic computer 13. Cables 14 connect the machines.

The paper tape unit may be any of several commercially available tape readers meeting the following specifications:

It stops on the stop character sprocket bit.
It brakes under remote electrical control.
It clutches under remote electrical control.
It scans tape continuously, even while braked.

The Ferranti TR–2 paper tape reader is an example.

The electronic computer may be any of several commercially available computers which is capable of performing checking functions on input data and which calls for input data by select and copy signals; the computer controls coincidence of copy and select signals and time-sequence relationship of select signals to command the tape unit to read, reread, halt tape, or reread stationary tape. The IBM Type 704 computer is an example.

Paper tape is transported and photoelectrically read by the paper tape unit, serially by character, parallel by bit. The mark bits of the character currently being read condition lines 15; the sprocket hole currently being read conditions lines 16. Control Unit 12 is jointly responsive to conditioning by the paper tape unit of sprocket line 16 and to conditioning by the computer of select line 17 and copy line 18. Properly conditioned, and under its own internal control, the control unit 12 selectively conditions brake line 19 or clutch line 20 to cause or inhibit the operation of the paper tape transport. The control unit also conditions read-in line 21, which conditions gate 22 for data transmittal via gated data lines 23 to computer 13. The control unit additionally conditions "drop copy" line 24 and "drop select" line 25 which makes possible a sequence and time coding of select and copy signals to control paper tape transport, reading and rereading, as will be explained in connection with FIG. 3.

Figure 3:
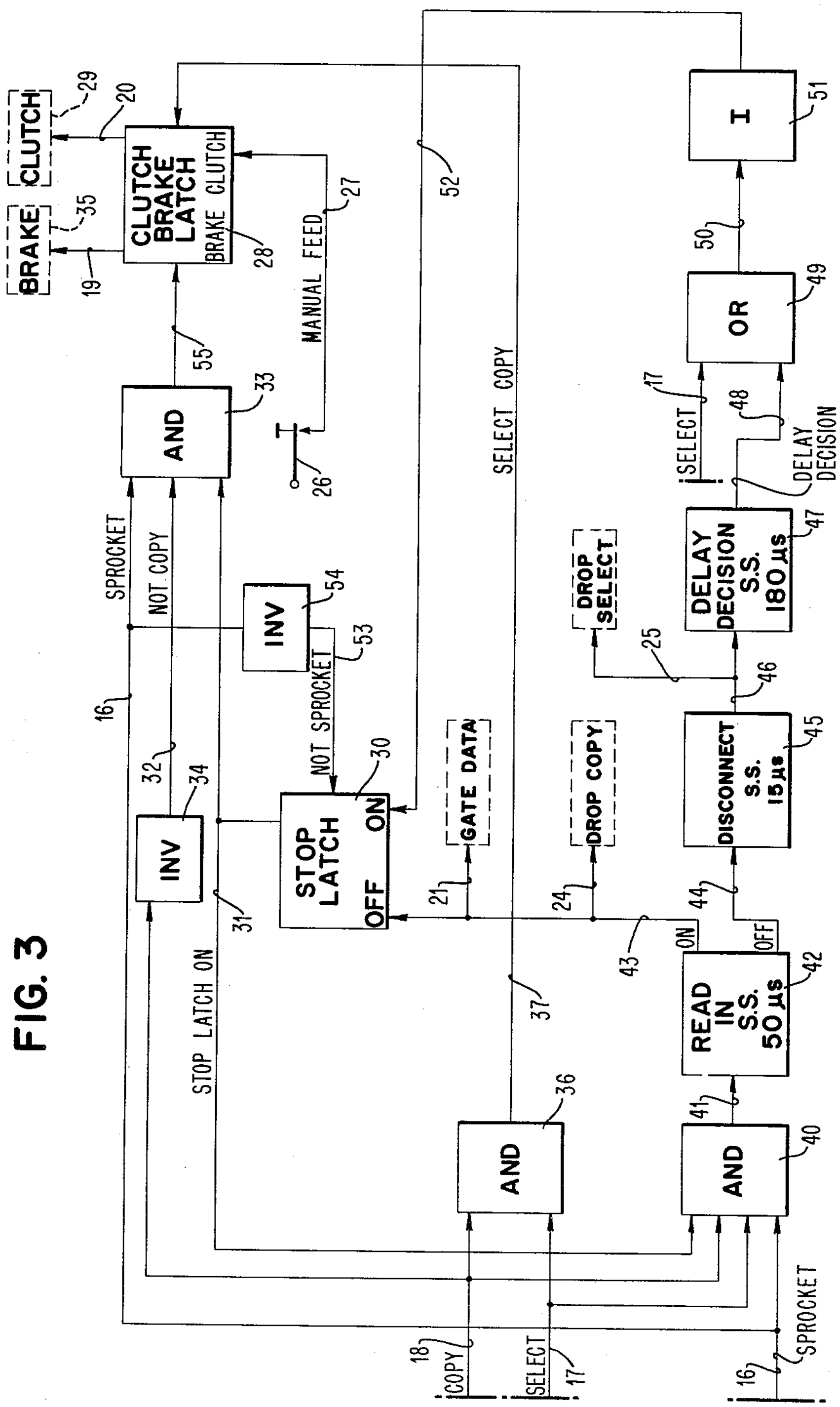
FIG. 3 is a schematic diagram of the control unit according to the invention.
Figure 4:
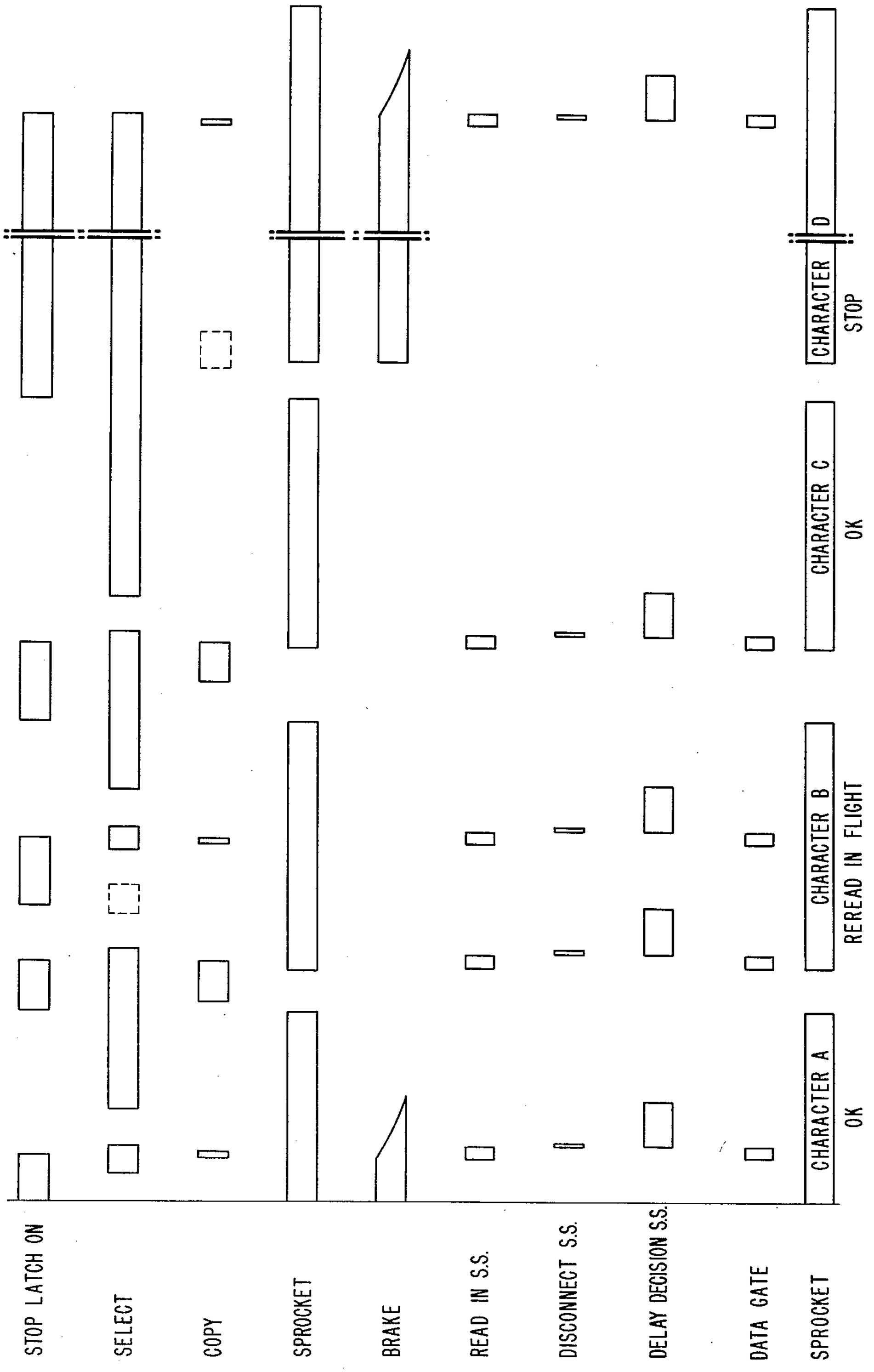
FIG. 4 is a timing chart.

*FIGS. 3 and 4—Control Unit and Timing*

As explained in conjunction with FIG. 2, sprocket, select and copy signals are available via lines 16, 17 and 18 respectively; paper tape transport control is effective via brake line 19 and clutch line 20, the gate control is accomplished via line 21, and "drop copy" and "drop select" functions are controlled via lines 24 and 25, respectively.

To commence operation, tape is loaded on the transport and manual feed key 26 depressed, connecting a suitable conditioning potential via manual feed line 27 to the clutch side of brake-clutch 28, conditioning clutch 29 via clutch line 20 to start the tape transport. So long as the manual feed button is depressed, the tape transport operates, running in the tape leader or unwanted portions. When the manual feed key is released, tape transport continues until a sprocket signal on sprocket line 16 coincides with the stop latch 30 on signal (which conditions "stop latch on" line 31) with a "not copy" signal via line 32 to AND circuit 33. The "not copy" signal is generated by inverter 34 which has copy line 18 as its input. Stop latch 30 was set "on" as a result of the previous stop, or by wired circuits responsive to the main power switch.

Coincident conditioning of inputs 16, 31 and 32, representing sprocket, not copy, and stop latch on, resets brake-clutch latch 28 to "brake," conditioning brake line 19 to cause operation of brake 35 to stop the tape transport on the sprocket hole, setting the control unit in an initial state.

The initial state of the unit is as follows, with the tape stopped on a character (sprocket hole), as shown by FIG. 4:

Stop latch 30—On—Line 31 conditioned.
Read select line 17—Deconditioned.
Copy line 18—Deconditioned.
Sprocket line 16—Conditioned.
Brake—On.
Data gate line 21—Deconditioned.

*Character A—OK*

It is desired to read character A, which is adjacent the read station, test the character, and proceed to the succeeding character if it tests OK. (It is assumed that character A is OK.)

The sprocket signal persists during the duration of the stop. The computer, when the need is sensed, prepares for reception of character A by first conditioning read select line 17, and, slightly later, conditioning copy line 18. The coincident conditioning of read select and copy lines 17 and 18 operates AND circuit 36 to condition "select-copy" line 37 which sets clutch-brake latch 28 to clutch, initiating tape transport. Four-input AND circuit 40 operates on coincidence of read select, copy, sprocket, and "stop latch on" signals via lines 17, 18, 16 and 31, respectively; conditioning of the AND output line 41 fires read-in single shot 42, conditioning line 43 to gate data via line 21, to drop copy via line 24 and to reset stop latch 30 to "off."

Read-in single-shot 42 has a 50 microsecond duration. Line 44 is conditioned, firing disconnect single-shot 45, of 15 microsecond duration. Line 46 is conditioned, conditioning line 25 to drop select, and firing delay decision single-shot 47, of 180 microsecond duration. The decision time of 50 read-in plus 180 delay decision microseconds provides the computer with ample time to check the character and make the decision whether or not to command a reread and whether or not to command a halt.

Delay decision line 48 is conditioned for the duration of the decision time since select line 17 remains conditioned until the disconnect single-shot 45 drops select; disconnect single-shot 45 concurrently fires delay decision single shot 47, which conditions line 48 for a continuous input to OR circuit 49.

Line 50, therefore, remains conditioned until the end of decision time. Inverter 51 holds line 52 deconditioned during decision time; there is no effect on stop latch 30.

Character A being accepted, the computer commands the tape transport to position for reading character B by conditioning select line 17 during the decision delay. The clutch remains engaged and the tape transport continues to carry character A past the read station. The relatively small sprocket hole disappears first, causing deconditioning of line 16 and conditioning of "not sprocket" line 53 through inverter 54 to set stop latch 30 to on.

*Character B—Reread in Flight*

It is assumed that the computer recognizes a need for data during the "not sprocket" time between characters; it conditions copy line 18, completing coincident input to two-input AND circuit 36, which is merely insurance since the brake-clutch latch 28 has been previously set to clutch. The final control signal necessary for the reading of character B is the sprocket signal—when it arrives, completing coincident input to four-input AND circuit 40, the read in, disconnect, delay decision sequence is followed. It is assumed that this character is not acceptable by the computer, which commands a reread by a deliberate refusal to condition select line 17 during the decision delay (note the missing (dotted) signal in FIG. 4). Thus, when delay decision single-shot 47 subsides, and delay decision line 48 is deconditioned (select line 17 input to OR circuit 49 having been previously deconditioned as a result of the operation of disconnect single-shot 45) there is no input to OR circuit 49 and line 50 is deconditioned. Inverter 51 conditions line 52 to set the stop latch. Coincident conditioning of input lines 16, 32 and 31 operates AND circuit 33, conditioning line 55 to reset clutch-brake latch 28 to brake, initiating a tape halt. The computer, however, operates at much higher speeds than the electro-mechanical tape brake. A second select and copy signal pair are assumed to be transmitted from the computer, which signal pair teams with the continuing sprocket signal and the "stop latch on" signal to complete coincident inputs to four-input AND circuit 40 and two-input AND circuit 36, initiating a second read-in, disconnect, delay decision sequence for character B. Character B is assumed to be accepted by the computer on the second read-in, which causes stop latch 30 to remain off and tape transport to continue to character C.

*Character C—OK*

This character cycle differs from that for character A merely in the sequence of control signals. Stop latch 30 is again turned on by the "not sprocket" signal. The computer is assumed to condition select 17 early and copy 18 slightly later. Thus, just as for the first read operation on character B, the final operative control signal for character C is the sprocket signal.

*Character D—Stop*

The computer is assumed to be busy with other operations as character D arrives at the read station. The tap transport stops on the sprocket hole of character D because there is no copy signal (note the missing (dotted) copy signal in FIG. 4). Coincident inputs on sprocket line 16, "not copy" line 32, and "stop latch on" line 31 operate three-input AND circuit 33 to reset clutch-brake latch 28 to brake. The tape transport halts on the sprocket hole of character D. After some considerable lapse of time, the computer is assumed to command transmittal of character D by conditioning copy line 18 (the other three inputs to four-input AND circuit 40 remained conditioned during the halt) whereupon a read-in, disconnect, delay decision sequence is initiated as tape starts. Character D is assumed to be OK; continuous operation is resumed.

In order to read the final character of a first record group of characters, and cause tape transport to the initial character of the following record group, the computer may read and recognize the record group end character and condition select during the decision delay and thereby cause tape transport to the initial character of the following record group. Select may then be deconditioned, without a coincident copy signal. This sequence of operations, which may be programmed with ease, is required to prevent possible confusion of the group end character and the initial character of the following group, since without such programming the group end character of the first group would remain in reading position and be reread.

Stationary tape, standing on a sprocket hole (on a character) may be reread without transport by a coincident select and copy, with no successive select during any decision delay.

It has been shown how computer control over the tape transport is accomplished by two signals, select and copy, which, according to their coincidence and the sequence of successive select signals, are recognized by the control units as commands for the tape transport, namely, read, reread, halt tape, and read stationary tape.

The sprocket signal may conveniently be taken directly from the sprocket track in paper tape, or may be generated by any other means such as recognition circuits operating off the data bits themselves, or a mechanical pulse generator synchronized with the data characters. Tapes may conveniently be punched paper tapes, black-spot photosensitive tapes, or any other elongated record medium which can provide continuous data signals synchronous to a continuous sprocket signal.

The component circuits used in carrying out the invention are standard circuits well known in the art. Texts such as Richards, Digital Computers, Components and Circuits, Van Nostrand, 1957, explain such components in detail.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A control unit for operating a reader-transport for coded tapes having groups of data arranged serially for input to a computer operating at a much higher speed than the tape transport, the tape reader being capable of conditioning a plurality of lines in a data channel according to the group of data, and conditioning a sprocket line indicating the presence of the group of data at the read station, the transport having electrically operable clutch and brake devices, and the computer being adapted to command the transmission of a group of data by coincident conditioning of a select line and a copy line, and to decondition said select line and said copy line as a result of appropriate signals from the control unit, which comprises: a two-state stop device, means responsive to the deconditioned state of the sprocket line for setting "on" said two-state stop device, a "stop device on" line conditioned by said stop device, a two-input logical AND device operable on coincident conditioning of the select line and copy line, a four-input logical AND device operable on coincident conditioning of said "stop device on" line and the select line, copy line, and sprocket line, a two-state clutch-brake device for controlling movement of the tape transport responsive to said two-input logical AND device to be set to "clutch," a single-shot read-in device operable by said four-input logical AND device and effective to reset said stop device to "off" to gate data for transmission to the computer and to signal the computer to decondition the copy line, a single-shot disconnect device operable upon the termination of operation of said read-in device, effective to signal the computer to decondition the select line, a single-shot delay decision device responsive to said disconnect device, effective to condition a delay decision line for a standard time duration decision delay during which the computer is normally operable to determine the acceptability of the transmitted group of data preparatory to commanding reread, halt or continue to the tape reader-transport, the "reread" command requiring that said select line remain deconditioned at the termination of the decision delay, after which coincident conditioning of select and copy commands a reread, the "halt" command requiring that said select line remain deconditioned at the termination of the decision delay, and the "continue" command requiring that said select line be conditioned prior to termination of said decision delay, and logical OR-inverter means jointly responsive to said delay decision line and the select line for setting said stop device to "on."

2. A control unit for a data processor-tape reader system, the tape reader of which has the characteristics of providing a continuous sprocket signal and continuous data signals during an indefinite period of sojourn of a particular tape character in reading position and of being capable of stopping the tape on-the-character-in-reading-position, and which data processor selects a particular tape reader by a select signal and calls for data from the tape reader by a copy signal, the control unit comprising:

(*a*) gate control means conditioned by a plurality of signals including select, copy and sprocket for initiating a data transfer from tape reader to data processor;

(*b*) delay decision means connected to said gate control means to produce a delay decision signal of standard duration following a data transfer initiation;

(*c*) stop means jointly responsive to control signals including the sprocket signal to control the tape reader to stop tape on-the-character-in-reading-position;

(*d*) reread stop control means connected to the data processor and to said delay decision means, normally operable to condition said stop means (*c*) at termination of the delay decision signal so that the tape stops and remains in reread position and selectively inhibitable by an additional select signal during the effective duration of the delay decision signal, so that the tape reader continues to feed tape; and (*e*) not-sprocket stop control means conditionable upon termination of the sprocket signal to condition said stop means (*d*) for stopping on the next character.

References Cited in the file of this patent

UNITED STATES PATENTS

| | | |
|---|---|---|
| 2,679,638 | Benskey et al. | May 25, 1954 |
| 2,968,793 | Bellamy | Jan. 17, 1961 |

OTHER REFERENCES

Welby: "Intermittent-Feed Computer Tape Reader," Electronics, February 1953 (pages 115–117). (Copy available in Scientific Library.)